United States Patent [19]
Cheng

[11] Patent Number: 5,176,250
[45] Date of Patent: Jan. 5, 1993

[54] HANDY DISK STORAGE BOX

[76] Inventor: Billy Cheng, 6F, No. 31-9, San Min Rd., Hsin Tien, Taipei Hsien, Taiwan

[21] Appl. No.: 831,531

[22] Filed: Feb. 5, 1992

[51] Int. Cl.[5] .............................................. B65D 85/57
[52] U.S. Cl. .................................. 206/45.13; 206/309; 206/313; 220/343
[58] Field of Search ............... 206/307, 309, 310, 311, 206/312, 313, 444, 45.13, 45.15, 45.18; 220/337, 338, 343

[56] References Cited

U.S. PATENT DOCUMENTS

| | | | |
|---|---|---|---|
| 4,538,730 | 9/1985 | Wu | 206/309 X |
| 4,778,047 | 10/1988 | Lay | 206/311 X |
| 4,802,605 | 2/1989 | Salmon et al. | 220/338 |
| 4,844,260 | 7/1989 | Jaw | 206/311 X |
| 4,867,302 | 9/1989 | Takahashi | 206/312 X |
| 5,099,995 | 3/1992 | Karakane et al. | 206/312 X |

Primary Examiner—Jimmy G. Foster
Assistant Examiner—Jacob K. Ackun, Jr.
Attorney, Agent, or Firm—Fleit, Jacobson, Cohn, Price, Holman & Stern

[57] ABSTRACT

A disk storage box comprised of two pivoted shells connected by two axle caps with a hollow shaft retained therebetween to hold a plurality of flat disk holders. Lifting one shell from the other causes said axle caps to rotate said hollow shaft, permitting said flat disk holders to be spread out like a fan for arranging laser disks or floppy disks conveniently. Stop strips are made in connecting rings on one shell to confine said axle caps to be rotated within a fixed angle.

3 Claims, 3 Drawing Sheets

HANDY DISK STORAGE BOX

BACKGROUND OF THE INVENTION

The present invention relates to a disk storage box. More particularly, the present invention relates to a handy disk storage box for keeping laser disks or computer floppy disks in order. The disk storage box has a plurality of disk holders at the inside which will be spread out for arranging laser disks or floppy disks easily when the box is opened.

Several storage boxes have been known and used for keeping audio or video laser disks. However, they are commonly heavy and not convenient in use. Because they are commonly made in a fixed structure, stored disks are piled up together causing arrangement difficult. There are also provided handy storage boxes for keeping computer floppy disks. These storage boxes are simply comprised of two pivoted shells for holding computer floppy disks together. The computer floppy disks may drop here and there when a storage box is opened.

SUMMARY OF THE INVENTION

The present invention has been accomplished to eliminate the aforesaid disadvantages. It is therefore an object of the present invention to provide a handy disk storage box which is suitable for keeping laser disks as well as computer floppy disks in order. It is another object of the present invention to provide a handy disk storage box which can be spread out like a fan, for arranging laser disks or computer floppy disks conveniently. It is still another object of the present invention to provide a handy disk storage box which can be flexibly arranged according to the quantity of disks to be stored.

According to the present invention, there is provided a handy disk storage box which is generally comprised of a casing formed of two pivoted shells, namely, an upper shell and a bottom shell. The upper shell has a first pair of opposite rings at a rear end thereof, while the bottom shell has a second pair of opposite rings at a rear end thereof. The first pair of opposite rings are connected to the second pair of opposite rings by two axle caps with a hollow shaft retained therebetween for holding a plurality of flat disk holders. The axle caps each has a two opposite, projecting spring plates on a peripheral wall surface thereof movably respectively retained between two opposite pairs of stop strips on either one of said second pair of opposite rings, a plurality of projections on said peripheral wall surface in mesh with a plurality of teeth on either one of said first pair of opposite rings, and two opposite notches on a front end edge thereof for fastening the hollow shaft. The hollow shaft has two pairs of opposite, arched projecting strips at two opposite ends respectively inserted into the two opposite notches on each axle cap, an elongated opening longitudinally formed on a peripheral surface thereof, and two lines of pin holes on two opposite end walls of the elongated opening for mounting disk holders. Each disk holder may be made from a flat plate having a center shaft at the center of a circular recess thereof for holding a laser disk, or made from a flat frame having a flat storage space therein for holding a floppy disk. Further, each disk holder has two cuts on an outer edge of a side extension thereof at two opposite ends, two opposite pegs connected to the side extension at two opposite ends adjacent to the cuts and respectively inserted in either two opposite pin holes on the hollow shaft. Opening the casing causes the disk holders to be spread out for arranging disks.

DETAILED DESCRIPTION OF THE PREFERRED EMBODIMENT

Figure 1:
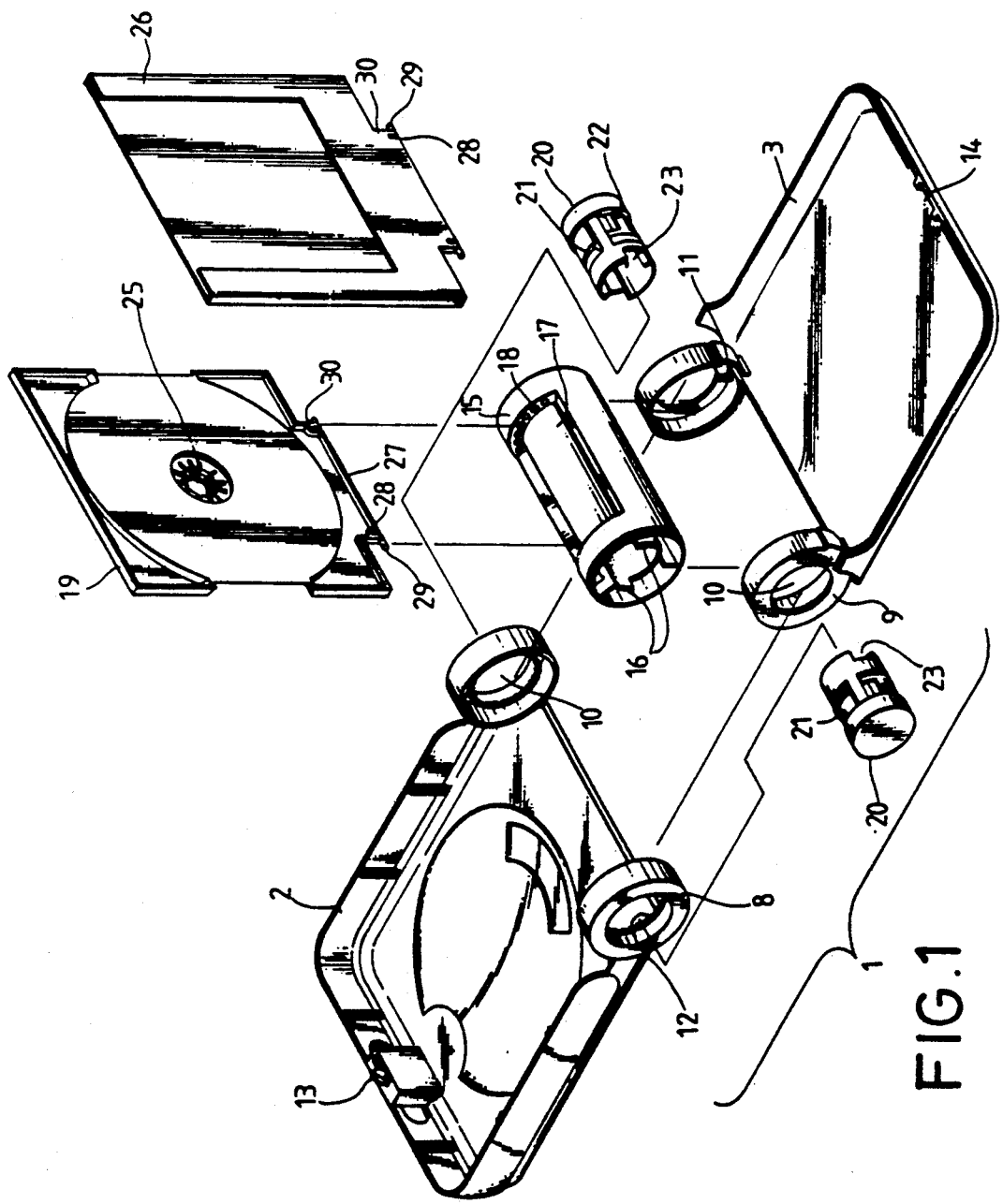
FIG. 1 is an exploded view of the preferred embodiment of the handy disk storage box of the present invention.

Referring to FIG. 1, a handy disk storage box is generally comprised of a casing 1 formed of an upper shell 2 and a bottom shell 3, a hollow shaft 15, two identical axle caps 20, and a plurality of disk holders 19. The upper and bottom shells 2, 3 each has two opposite rings 8, 9 longitudinally aligned at the rear end thereof. By connecting the rings 8 on the upper shell 2 to the rings 9 on the bottom shell 3 respectively, two opposite axle holes 10 are formed for fastening the two axle caps 20 in securing the hollow shaft 15 therebetween, and therefore, the upper and bottom shells 2, 3 are pivoted to each other. The rings 9 on the bottom shell 3 are symmetrical, of which each having two opposed pairs of stop strips 11 on the inner wall surface thereof for confining the axle caps 20 to be rotated within a fixed angle. The rings 8 on the upper shell 2 are symmetrical, of which each having a plurality of teeth 12 around the inner wall surface thereof for carrying the axle caps 20 to rotate. The upper shell 2 has a spring latch 13 at the front end thereof. When the casing 1 is closed, the spring latch 13 is locked in a hole 14 on the front end of the bottom shell 3 causing the upper and bottom shells 2, 3 to be locked. As indicated, the axle caps 20 are respectively inserted into the axle holes 10 on the rings 8, 9 from the outside, to secure the hollow shaft 15 therebetween. Each axle cap 20 has two opposite, projecting spring plates 21 on the peripheral wall surface thereof movably respectively retained between the two opposite pairs of the stop strips 11 on either ring 9 of the bottom shell 3, a plurality of projections 22 on the peripheral wall surface thereof in mesh with the teeth 12 on either ring 8 of the upper shell 2, and two opposite notches 23 on the front end edge thereof for engaging the hollow shaft 15. By means of engaging the projections 22 with the teeth 12, the axle caps 20 can be rotated by the upper shell 2. Because the projecting spring plates 21 of the axle caps 2 are respectively inserted in the spaces between the two opposite pairs of stop strips 11 on each ring 9 of the bottom shell 3, the axle caps 20 are confined to be rotated within a fixed angle. Further, by inserting the projecting spring plates 21 into the axle holes 10, the upper and bottom shells 2, 3 are firmly secured together by the axle caps 20 and can be rotated against each other. The hollow shaft 15 has two pairs of opposite, arched projecting strips 16 at two opposite ends respectively inserted into the two opposite notches 23 on either axle cap 20, an elongated opening 17 longitudinally formed on the peripheral surface thereof, and two lines of pin holes 18 on the two opposite end walls of such elongated opening 17 for mounting disk holders 19.

Referring to FIG. 1 again, a disk holder 19 may be made from a flat plate having a center shaft 25 at the center of the circular recess thereof for holding a laser disk, or a flat frame 26 for holding a floppy disk. Each disk holder 19 has two cuts 28 on an outer edge of a side extension 27 thereof at two opposite ends, two opposite pegs 29 connected to such side extension 27 by connecting portions 30 and longitudinally aligned at two opposite locations adjacent to the cuts 28. By means of the arrangement of the cuts 28 on the side extension 27, the two opposite pegs 29 can be flexibly squeezed inwards for inserting in either two opposite pin holes 18 on the two opposite end walls of the elongated opening 17 of the hollow shaft 15. The width of the elongated opening 17 on the hollow shaft 15 can be made according to the number of disk holders 19 to be held inside the casing 1.

Figure 2:
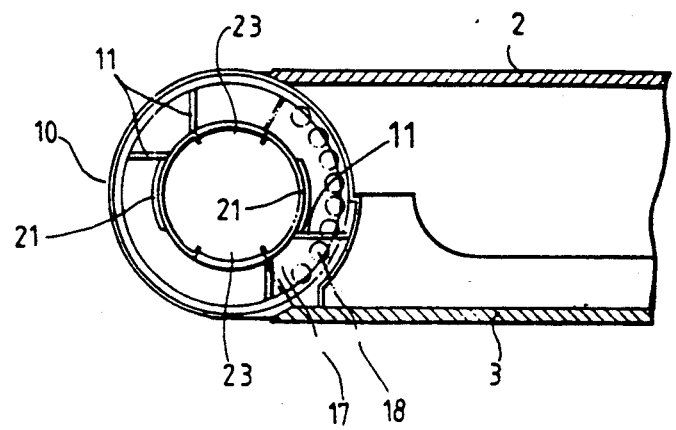
FIG. 2 a sectional view showing the disk storage box in closed position.
Figure 3:
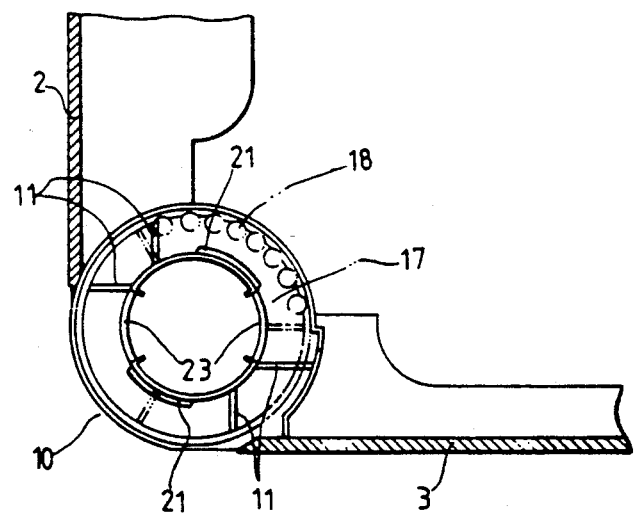
FIG. 3 is a sectional view showing the disk storage box in half opened position.
Figure 4:
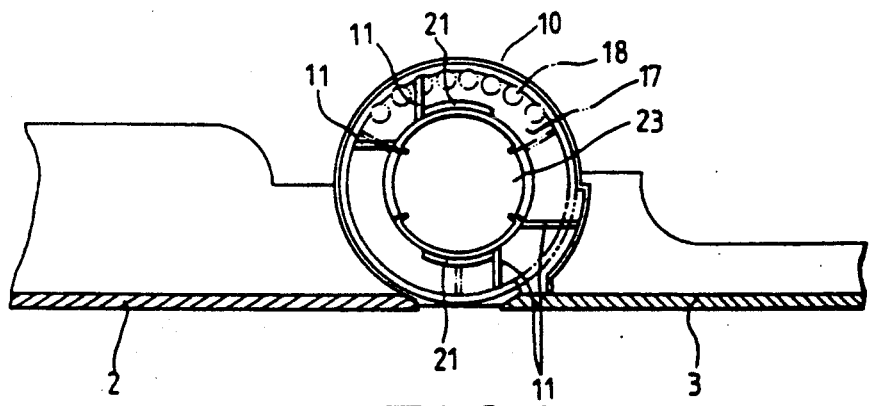
FIG. 4 is a sectional view showing the disk storage box in full-opened position.
Figure 5:
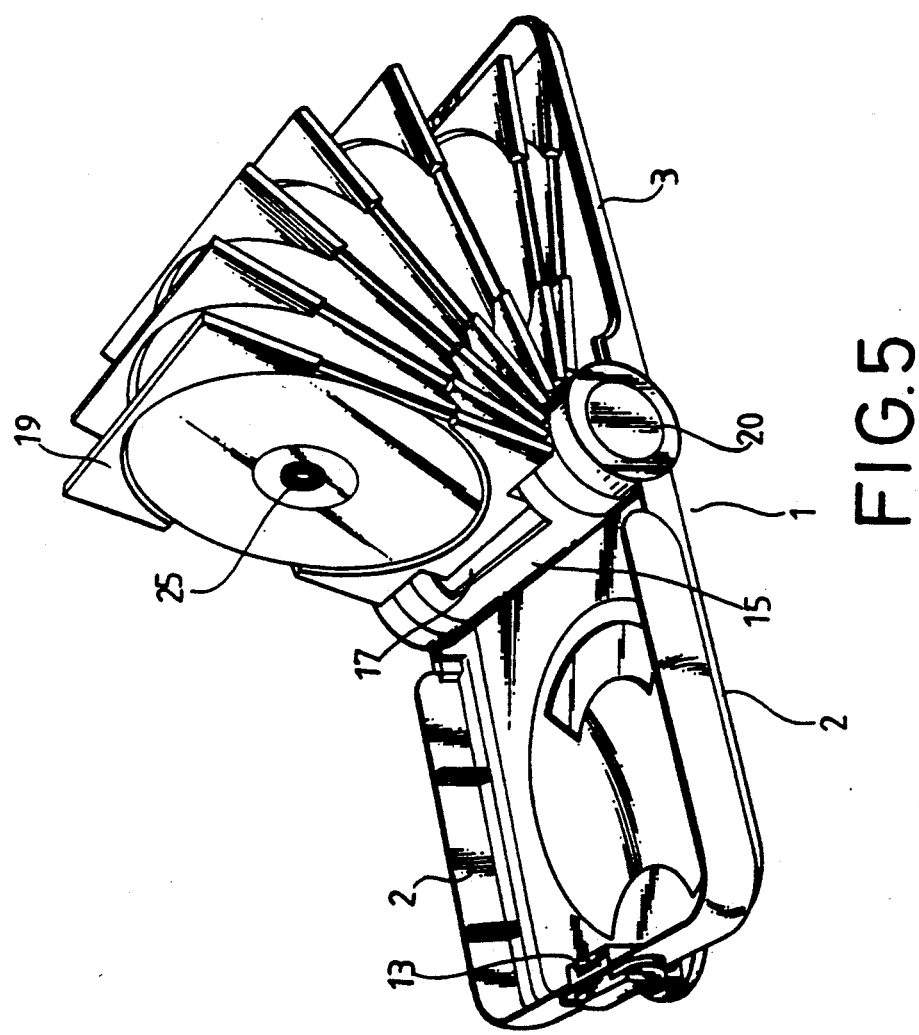
FIG. 5 is a perspective view of the disk storage box in a spread out status.

Again referring to FIGS. 1 and 2, lifting the upper shell 2 from the bottom shell 3 causes the rings 8 to rotate the axle caps 20 and the hollow shaft 15 (because the teeth are in mesh with the projections 22, and the arched projecting strips 16 are engaged into the notches 23). Rotating the hollow shaft 15 on the rings 9 causes the disk holders 19, that are secured to the hollow shaft 15, to be spread out like a fan. Referring to FIG. 3 and 4, continuously extending out the upper shell 2 relative to the bottom shell 3 causes the projecting spring plates 21 to be stopped by the stop strips 11 of the rings 9 of the bottom shell 3, and therefore, the axle caps 20 are prohibited from being carried to rotate by the teeth 12 of the rings 8. When the disk holders 19 are spread out, shown as FIG. 5, arranging laser disks or floppy disks becomes easy. In performing the aforesaid procedure in reverse order, the disk holders 19 are received back inside the casing 1.

What is claimed is:

1. A disk storage box comprising a casing formed of two pivoted shells, said two pivoted shells including a bottom shell and an upper shell, said upper shell having a first pair of opposite rings at a rear end thereof, said bottom shell having a second pair of opposite rings at a rear end thereof, said first pair of opposite rings being connected to said second pair of opposite rings by two axle caps with a hollow shaft retained therebetween for holding a plurality of flat disk holders, and characterized in that said axle caps each has a two opposite, projecting spring plates on a peripheral wall surface thereof movably respectively retained between two opposite pairs of stop strips on either one of said second pair of opposite rings, a plurality of projections on said peripheral wall surface in mesh with a plurality of teeth on either one of said first pair of opposite rings, and two opposite notches on a front end edge thereof for fastening said hollow shaft; said hollow shaft has two pairs of opposite, arched projecting strips at two opposite ends respectively inserted into said two opposite notches on each axle cap, an elongated opening longitudinally formed on a peripheral surface thereof, and two lines of pin holes on two opposite end walls of said elongated opening for mounting said disk holders; said disk holders each has two cuts on an outer edge of a side extension thereof at two opposite ends, two opposite pegs connected to said side extension at two opposite ends adjacent to said cuts and respectively inserted in either two opposite pin holes on said hollow shaft.

2. The disk storage box of claim 1, wherein said disk holders each is made from a flat plate having a center shaft at the center of a circular recess thereof for holding a laser disk.

3. The disk storage box of claim 1, wherein said disk holders each is made from a flat frame having a flat storage space therein for holding a floppy disk.

* * * * *